US008371010B2

(12) United States Patent
Jill

(10) Patent No.: US 8,371,010 B2
(45) Date of Patent: Feb. 12, 2013

(54) AUTOMOTIVE MAINTENANCE TOOL

(76) Inventor: Joseph Jill, Anaheim, CA (US)

(*) Notice: Subject to any disclaimer, the term of this patent is extended or adjusted under 35 U.S.C. 154(b) by 311 days.

(21) Appl. No.: 12/796,630

(22) Filed: Jun. 8, 2010

(65) Prior Publication Data

US 2011/0035923 A1 Feb. 17, 2011

Related U.S. Application Data

(60) Provisional application No. 61/274,334, filed on Aug. 17, 2009.

(51) Int. Cl.
*B23P 19/04* (2006.01)

(52) U.S. Cl. ............. 29/426.1; 29/217; 29/216; 29/215; 29/426.6

(58) Field of Classification Search .................. 29/426.1
See application file for complete search history.

(56) References Cited

U.S. PATENT DOCUMENTS 2,213,102 A * 8/1940 Crook et al. .................... 29/216
2,755,540 A * 7/1956 Crozier ........................... 29/265
5,020,203 A * 6/1991 Rix ................................ 29/255
5,042,128 A * 8/1991 Barbour .......................... 29/217
7,975,357 B1 * 7/2011 Irving ............................ 29/217
2005/0076486 A1 * 4/2005 Alanis ............................ 29/217

* cited by examiner

*Primary Examiner* — Livius R Cazan
*Assistant Examiner* — Anthony Green
(74) *Attorney, Agent, or Firm* — Heidi L. Eisenhut; Loza & Loza, LLP

(57) ABSTRACT

Embodiments of a device and method for removing a valve spring from an engine are herein disclosed. In one embodiment, the device includes a base component with a compressor component removably connected to the base component via an elongate member threadedly engaged with the base component. A fastener may threadedly engage with the elongate member to reversibly keep the compressor component in place. The base component is configured to engage with opposing vertically-extending components on a cylinder head while the compressor component is configured to simultaneously engage with a valve spring. When rotational force is applied in a clockwork direction to the fastening component, the compressor component is forced in a downward direction thereby compressing the valve spring for subsequent removal thereof.

17 Claims, 6 Drawing Sheets

AUTOMOTIVE MAINTENANCE TOOL

CLAIM OF PRIORITY

This application claims priority to U.S. Provisional Application Ser. No. 61/274,334 filed Aug. 17, 2009 and hereby incorporated by reference.

FIELD OF INVENTION

Automotive maintenance tools.

BACKGROUND OF INVENTION

A Chrysler Hemi engine is a series of V8 internal combustion engines built by

Chrysler that utilize a hemispherical combustion chamber. Generally, a hemispherical combustion chamber (i.e., approximately bowl-shaped) allows the valves of a two valve-per-cylinder engine to be angled rather than side-by-side. This arrangement creates more space in the combustion chamber roof for the use of larger valves and also straightens the airflow passages through the cylinder head. These features significantly improve the engine's airflow capacity, which can result in relatively high power output from a given piston displacement. Chrysler has incorporated Hemi engines in many different vehicles for decades. Some modern Chrysler vehicles which incorporate (a modified version of) Hemi engines include the 2004 Dodge Ram and Dodge Durango; the 2005 Chrysler 300C, Dodge Magnum R/T and Jeep Grand Cherokee; the 2006 Dodge Charger R/T; and the 2009 Dodge Challenger R/T.

Like other engines, the Hemi engine operates by a four-stroke combustion cycle, i.e., an intake stroke, a compression stroke, a combustion stroke and a exhaust stroke as known by one of ordinary skill in the art. During this cycle, the valve spring is repeatedly compressed as a corresponding valve repeatedly opens or closes an intake or an exhaust channel. Over time, the valve spring may need to be replaced. Alternatively, a user may simply wish to upgrade a valve spring to increase performance of a vehicle.

Although Hemi engines are known to enhance performance of vehicles elative to conventional engines, maintenance of such engines can be difficult, time-consuming and/or laborious. For example, in order to remove and replace valve springs, the mechanic typically must first remove the cylinder heads or the entire engine from the vehicle. The process is time-consuming and labor-intensive and increases the overall cost of valve spring replacement tremendously.

SUMMARY OF INVENTION

A device for removing a valve spring, comprising: (i) a base component adapted to engage with opposing vertically-extending components on a cylinder head; and (ii) a compressor component slidably engaged with an elongate member, the elongate member threadedly engaged with an opening passing through a center of the base component is herein disclosed. In one embodiment, the base component comprises: a horizontally-oriented member with two vertically-oriented members extending therefrom at opposite ends of the horizontally-oriented member; and two projections horizontally and outwardly extending from each terminating end of the two vertically-oriented members. Each projection may include an opening passing through a center thereof. Two laterally-positioned elongate members may threadedly engage with the openings passing through the projections.

In one embodiment, the compressor component comprises a U-shaped member having a vertically-oriented support with an opening therethrough. A bottom surface of the U-shaped member may include a downwardly-projecting flange about a periphery thereof. When slidably engaged with the elongate member, the U-shaped member of the compressor component may project horizontally and outwardly relative to the base component. In one embodiment, a diameter of the elongate member is less than a diameter of the opening of the vertically-oriented support of the compressor component. The device may further include a fastening component threadedly engaged with the elongate member such that, when rotational force is applied in a clockwork direction to the fastening component, the compressor component is forced in a downward direction.

A device for removing a valve spring, comprising: (i) a base component, the base component comprising a U-shaped member with two outwardly extending projections extending from terminating ends of the U-shaped member; (ii) an elongate member at least partially engaged with an opening passing through a center of the base; and; (iii) a compressor component, the compressor component comprising a vertically-extending back support having a proximal end and a distal end wherein two outwardly-projecting prongs extend from the distal end of the vertically-extending back support, the compressor component slidably engaged with an elongate member via a bore through the vertically-extending back support is herein disclosed.

Each projection may further comprise a projection opening passing through a center of each projection. Each outwardly-projecting prong may further comprise a downwardly-projecting flange about a periphery thereof. When slidably engaged with the elongate member, the two outwardly-projecting prongs of the compressor component may project horizontally and outwardly relative to the base component. In one embodiment, a diameter of the elongate member is less than a diameter of the bore passing through the vertically-oriented back support of the compressor component. The device may further comprise a fastening component threadedly engaged with the elongate member such that, when rotational force is applied in a clockwork direction to the fastening component, the compressor component is forced in a downward direction. The device may further comprise two laterally-positioned elongate members threadedly engaged with the projection openings.

A method of removing a valve spring from an engine, comprising: (i) positioning two horizontally and outwardly-extending arms of valve spring tool on opposing vertically-extending components on a cylinder head; (ii) securing the arms to the opposing vertically-extending components by applying rotational force in a first direction to threaded members passing through openings in the arms and the opposing vertically-extending components; (iii) positioning two prongs of a compressor component on a valve spring head, the compressor component connected to the valve spring tool by slideable engagement with an elongate member, the elongate member threadedly engaged with a base component of the valve spring tool; (iv) applying rotational force in the first direction to the elongate member to compress the valve spring; and (v) applying rotational force in a second direction to the elongate member to remove the valve spring is herein disclosed. According to this method, the valve spring tool is positioned on the cylinder head while the cylinder head remains in the vehicle.

DETAILED DESCRIPTION

The following detailed description is of the best currently contemplated modes of carrying out the invention. The description is not to be taken in a limiting sense, but is made merely for the purpose of illustrating the general principles of the invention.

Embodiments of a device and method for removing a valve spring from an engine are herein disclosed. In one embodiment, the device includes a base component with a compressor component removably connected to the base component via an elongate member threadedly engaged with the base component. A fastener may threadedly engage with the elongate member to reversibly keep the compressor component in place. The base component is configured to engage with opposing vertically-extending components on a cylinder head while the compressor component is configured to simultaneously engage with a valve spring. When rotational force is applied in a clockwork direction to the fastening component, the compressor component is forced in a downward direction thereby compressing the valve spring for subsequent removal thereof.

Figure 1:
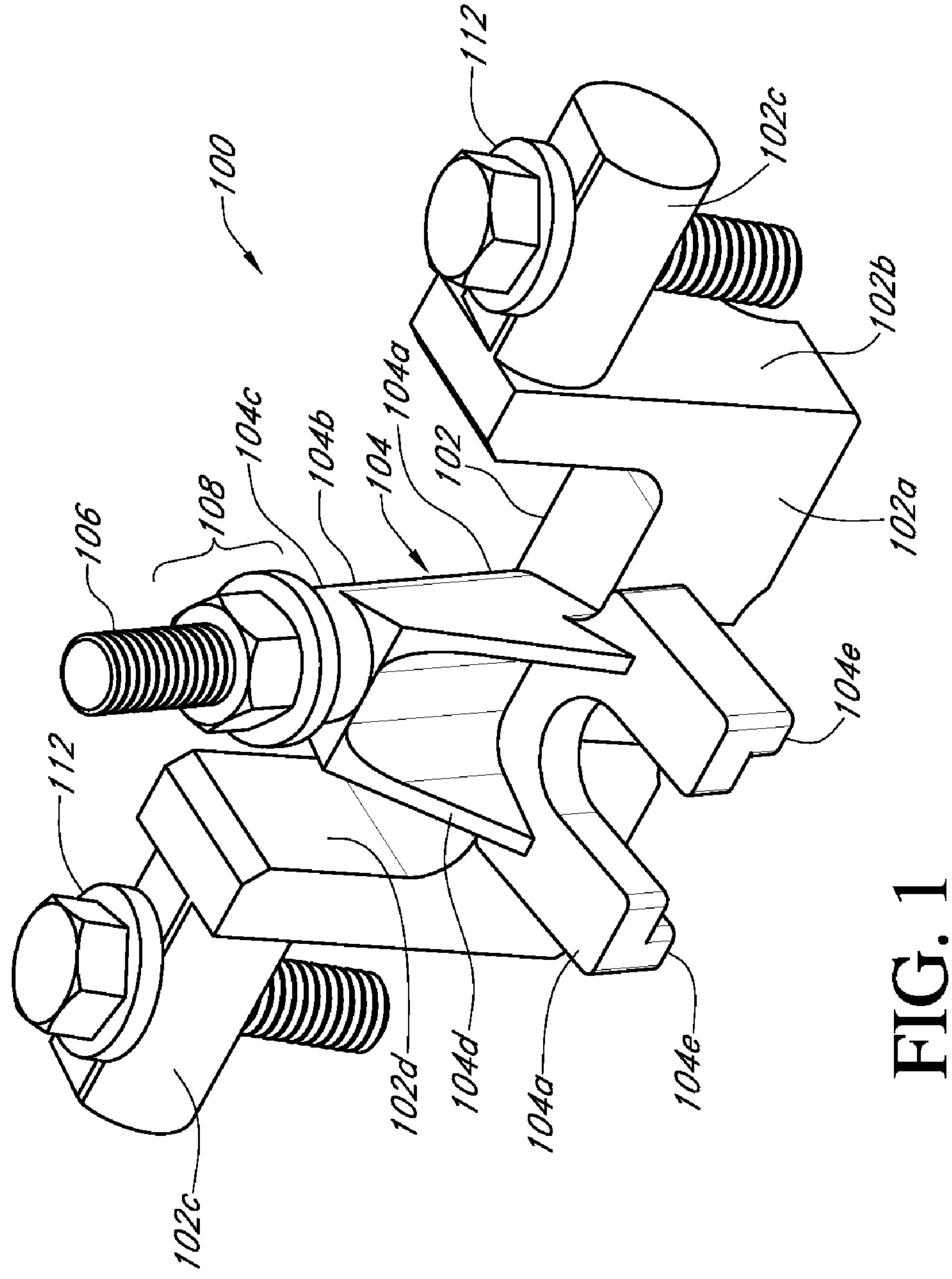
FIG. 1 illustrates a perspective view of a valve spring device according to an embodiment of the invention.

FIG. 1 illustrates a perspective view of a valve spring device according to an embodiment of the invention. The valve spring device (or valve spring tool) 100 may include a base component 102, a compressor component (or "foot") 104 and an elongate member 106 interconnected together. In one embodiment, the elongate member 106 slideably engages with an opening (not shown) in the compressor component 104 followed by threaded engagement with an opening (not shown) passing through a center of the base component 102. A fastening component 108 may threadedly engage with the elongate member 106 to hold the compressor component 104 in place. The fastening component 108 may be, e.g., a nut and washer such as known by one of ordinary skill in the art. According to embodiments of the invention, the compressor component 104 may freely ride along the elongate member 106 (see FIG. 2, arrows). In this respect, a diameter of the elongate member 106 is less than a diameter spanning the opening (not shown) of the compressor component 104.

In one embodiment, the base component 102 includes a horizontally-oriented member 102*a* with two vertically-oriented members 102*b* extending therefrom at opposite ends of the horizontally-oriented member 102*a*. That is, base member 102 may be approximately U-shaped. From each terminating end of each vertically-oriented 102*b*, a substantially cylindrical projection 102*c* having a flat or substantially flat top and bottom surfaces may extend outwardly and horizontally therefrom. This feature allows the projections 102*c* to make direct contact with cylinder head components (not shown, explained in more detail below) when the device 100 is used to remove a valve spring. An opening 110 (not shown) may pass through each projection 102*c* at approximately a center thereof. Each opening 110 (not shown) may be adapted to receive a threaded elongate member 112 such as a bolt. Generally, the base 102 spans five and seven-tenths (5.7) inches or six and one-tenth (6.1) inches across.

In one embodiment, the compressor component 104 includes an (approximately-shaped) U-shaped member 104*a* extending horizontally relative to the base component 102*a* (and when seated thereon) with a vertically-oriented support 104*b* (or back support 104*b*) extending in an upwardly direction relative to the U-shaped member 104*a*. The vertically-oriented support 104*b* essentially comprises a cylindrical member 104*c* with an opening or bore therethrough and at least two angled flanges 104*d* extending outwardly therefrom and welded or otherwise attached to a top surface of the U-shaped member 104*a*. On a bottom surface of the U-shaped member 104*a* two peripheral flanges 104*e* extend in a downwardly direction therefrom.

When the compressor component 104 is fully seated on the base component 102 (via the elongate member 106), the base of the U-shaped member 104*a* may approximately reside within the boundaries defined by the vertical members 102*b* of the base component 102. Simultaneously, the arms of the U-shaped member 104*a* project outwardly from a front boundary defined by the horizontal member 102*a* of the base component 102. In this manner, the compressor component 104 may swivel up to forty-five (45) degrees in a left and right direction (see arrows).

Figure 2:
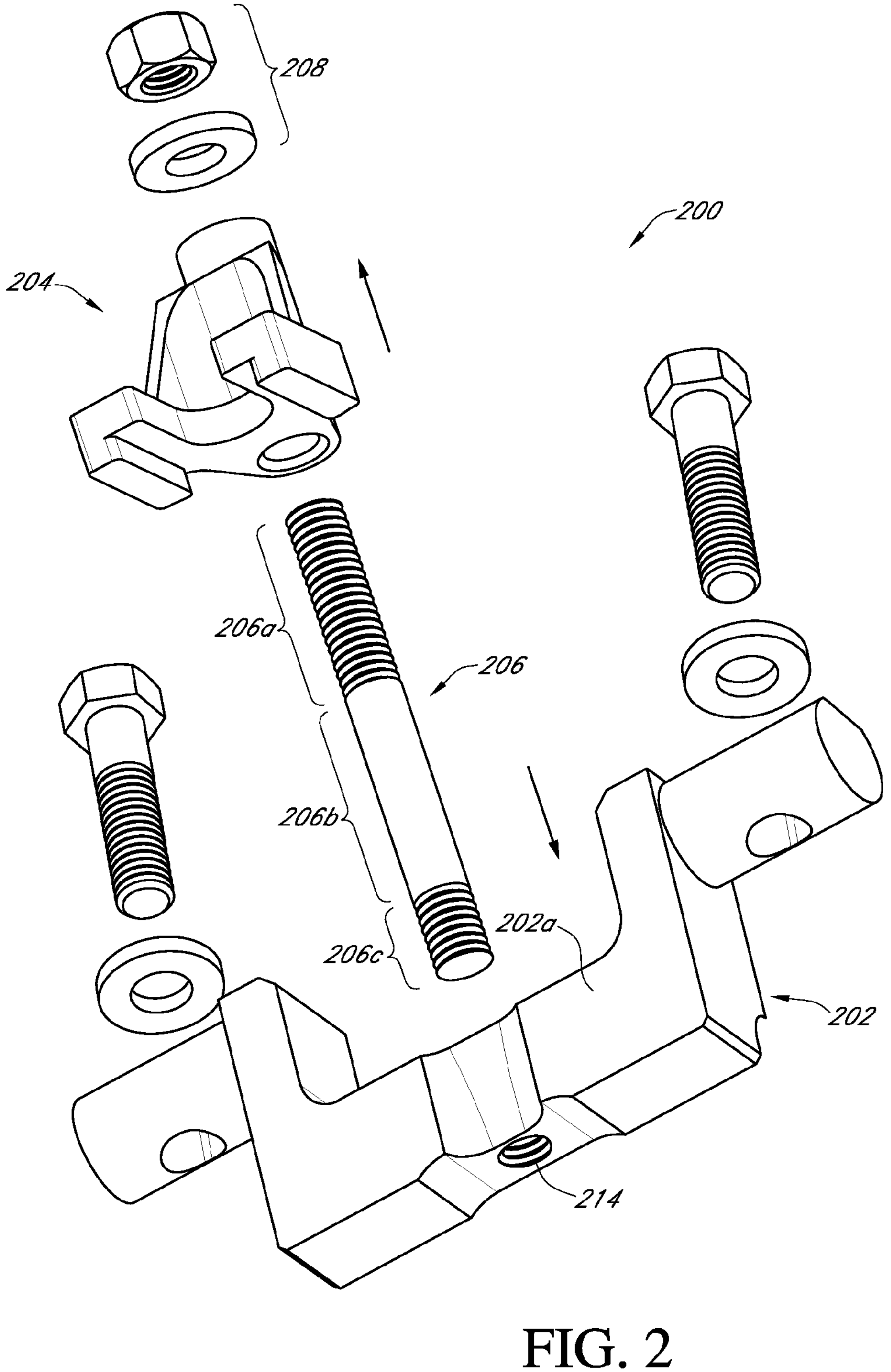
FIG. 2 illustrates an exploded view of the valve spring device of FIG. 1.

FIG. 2 illustrates an exploded view of the valve spring device of FIG. 1. In this view, the principle components of the valve spring device (or valve spring tool) 200 are shown in a disassembled state. More particularly, a base component 202, a compressor component (or "foot") 204 and an elongate member 206 are shown separately yet relationally relative to one another. In one embodiment, the elongate member 206 includes a threaded proximal portion 206*a*, a non-threaded middle portion 206*b* and a threaded distal portion 206*c*. These features allow the compressor component 204 to freely ride along the elongate member 206 when the components are assembled together (see FIG. 1). More particularly, when assembled, the distal portion 206*c* threadedly engages with an opening 214 passing through a center of the base component 202 while the proximal portion 206*a* threadedly engages with a fastening component 208. Meanwhile, the compressor component 204 freely rides along the elongate member 206 between a top surface of the horizontal member 202*a* of the base component 202 and the fastening component 208. The height of the elongate member 206 (or stud) may be altered at the distal portion 206*c* to be supplied for use with a standard valve spring or with a race/competition spring. Base component 202 may be supplied with a relief for either a standard valve or race/competition valve and spring. Materials which comprise the components include stainless steel or any other suitable metal alloy.

Figure 3B:
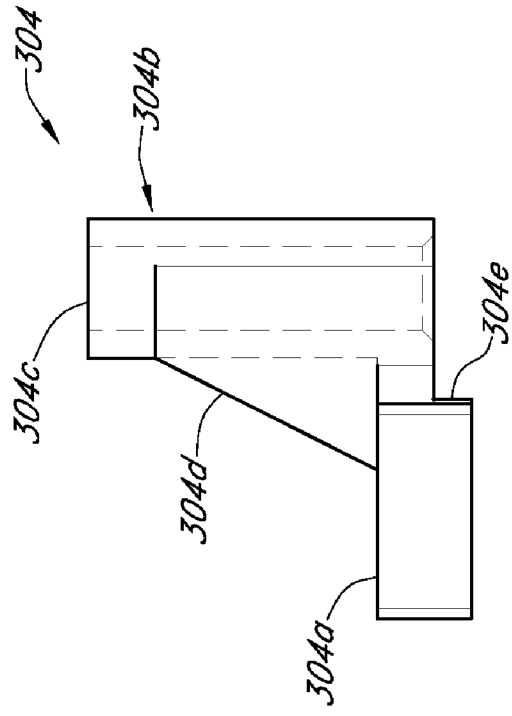
FIGS. 3A-3B illustrate front and side views of a compressor component according to an embodiment of the invention.
Figure 3A:
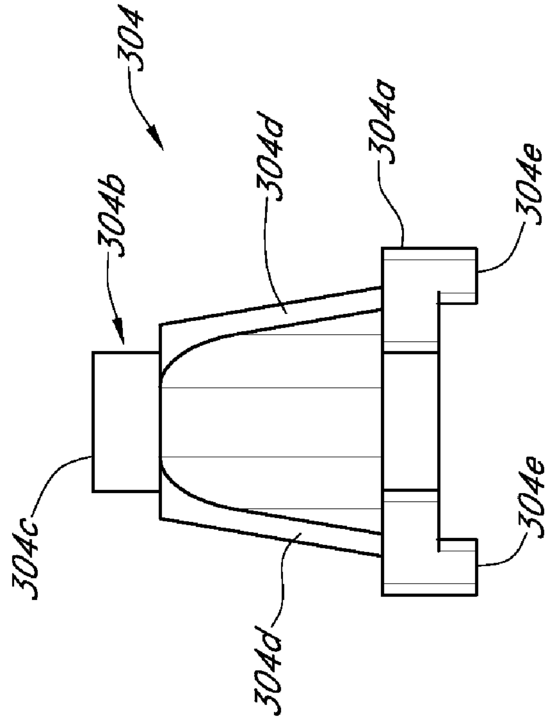

FIGS. 3A-3B illustrate front and side views of a compressor component according to an embodiment of the invention. As shown, the compressor component 304 includes a vertically-extending back support 304*b* having a proximal end and a distal end with a horizontally-extending U-shaped member 304*a* extending from the distal end of the vertically-extending back support 304*b*. That is, compressor component 304 approximates on "L" shape when viewed from the side (FIG. 3B). Vertically-extending back support 304*b* includes a cylindrical member 304*c* with a bore therethrough connected to the horizontally-extending U-shaped member 304*a* via angled flanges 304*d*. Peripheral flanges 304*e* are also shown on a bottom surface of the horizontally-extending U-shaped member 304*a* extending in a downward direction. Peripheral flanges 304*e* function to securely grip the head of a valve spring when positioned thereon. As shown in the front view (FIG. 3A), the horizontally-extending U-shaped member 304*a* may be described as comprising two prongs. This feature also functions to securely grip the head of the valve spring when positioned thereon.

Figure 4A:
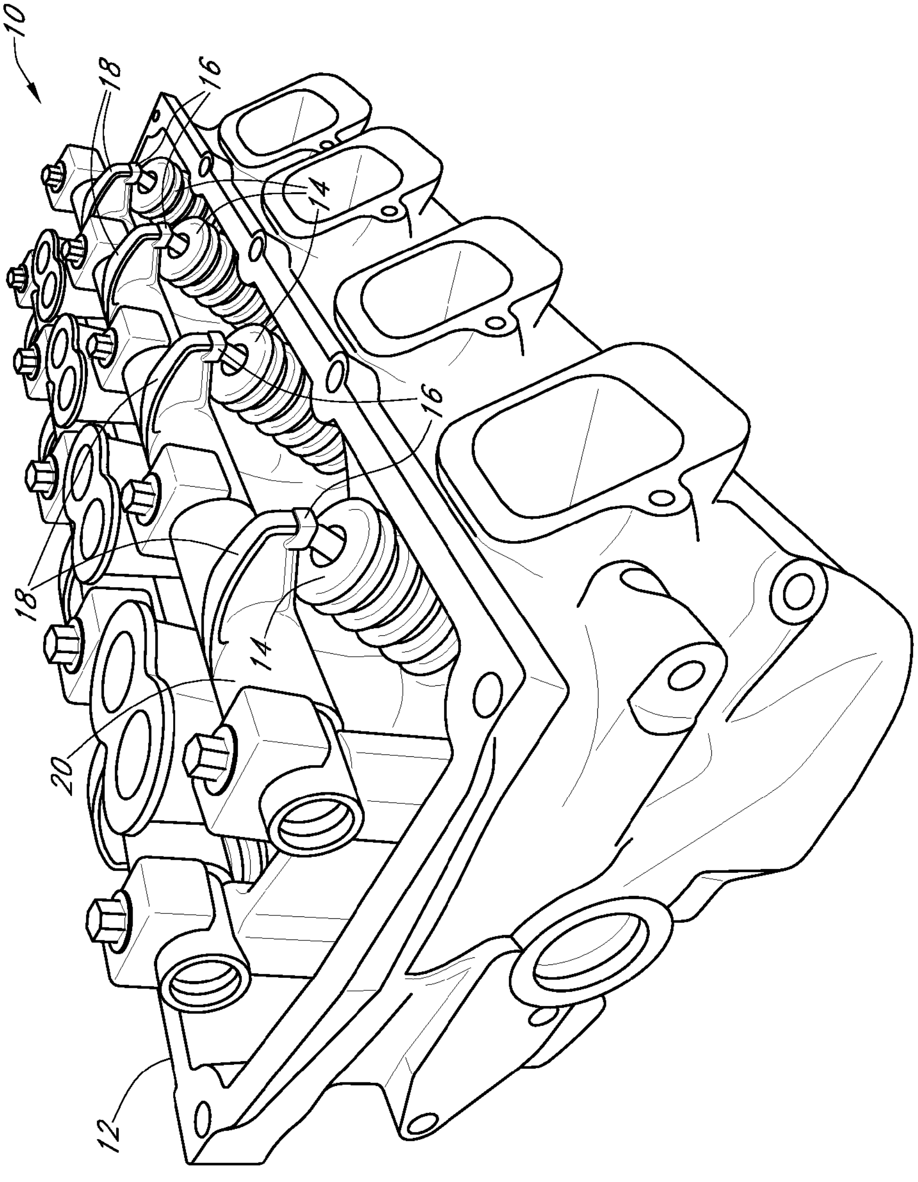
FIG. 4A (PRIOR ART)
FIG. 4A illustrates a perspective view of a Hemi engine as known by one of ordinary skill in the art.
Figure 4B:
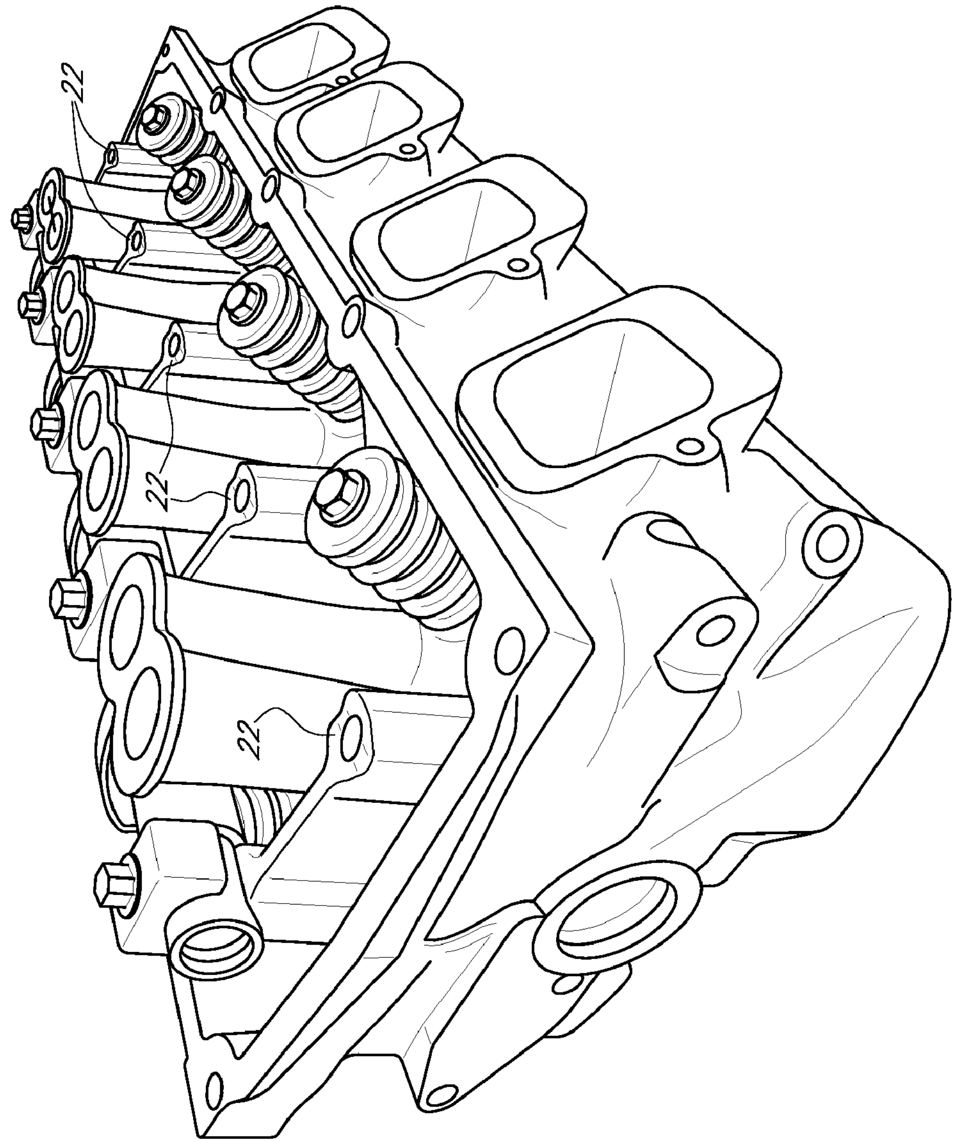
FIG. 4B illustrates a perspective view of the Hemi engine of FIG. 4A with the rocker shaft and rocker arms removed.

FIG. 4A illustrates a perspective view of a Hemi engine as known by one of ordinary skill in the art. As shown, the Hemi engine 10 includes standard components including a cylinder head 12 with a plurality of valve springs 14 situated in a linear array within the cylinder head 12. Extending from an opening in each valve spring 14 is a distal end of a valve spring retainer 16. Each retainer 16 is in mechanical communication with a rocker arm 18 which, in turn, is in mechanical communication with a rocker shaft 20 spanning the width of the cylinder head. FIG. 4B illustrates a perspective view of the Hemi engine of FIG. 4A with the rocker shaft 20 and rocker arms 18 removed.

Figure 5:
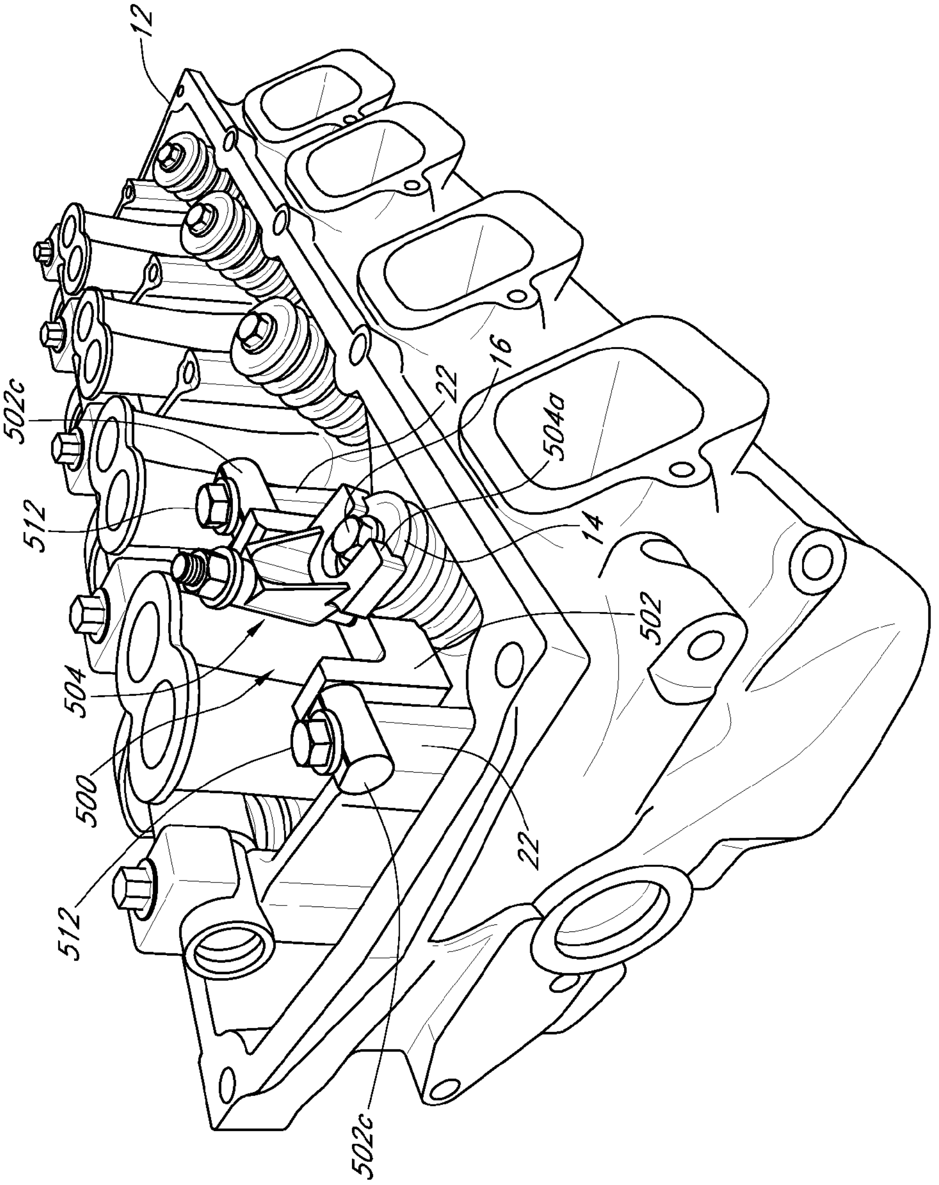
FIG. 5 illustrates a perspective view of a valve spring device according to an embodiment of the invention positioned on a Hemi engine.

FIG. 5 illustrates a perspective view of a valve spring device according to an embodiment of the invention positioned on a Hemi engine. According to one method, the horizontal protrusions 502*c* of base component 502 of the valve spring device 500 may be positioned on opposing vertically-extending components 22 (i.e., rocker shaft towers) of cylinder head 12 of the Hemi engine following removal of the rocker arms and the rocker shaft (not shown, see FIG. 4B). Meanwhile, the U-shaped member 504*a* of the compressor component 504 frictionally engages (i.e., contacts) with the distal end of the retainer 16 protruding through the valve spring 14.

Laterally-positioned elongate members 512 (i.e., bolts) passing through openings in horizontal protrusions 502*c* and through the opposing rocker shaft towers 22 may be secured to the rocker shaft towers 22 by applying rotational force in a first direction thereto. Using a socket and ratchet, elongate member 506 (i.e., stud) passing through openings in the compressor component 504 and through the base component 502 may compress the valve spring 14 by also applying rotational force in a first direction thereto. In this manner, the valve spring 14 is sufficiently engaged with the tool 500. Using the socket and ratchet, the valve spring 14 is removed by applying rotational force in a second direction to the stud 506. In an alternative embodiment, a crank shaft handle is used in place of the socket and ratchet.

Advantageously, the valve spring tool according to embodiments of the invention can be used to remove and replace valve springs in Hemi or other engines without first having to remove the cylinder heads or the entire engine from the vehicle. As a result, using the tool saves many hours of labor. Additionally, the tool is compact enough to fit into any automotive tool box.

While certain exemplary embodiments have been described and shown in the accompanying drawings, it is to be understood that such embodiments are merely illustrative of and not restrictive on the broad invention, and that this invention is not to be limited to the specific constructions and arrangements shown and described, since various other modifications may occur to those ordinarily skilled in the art.

What is claimed is:

1. A device for removing a valve spring, comprising:

a base component adapted to engage with opposing vertically-extending components on a cylinder head;

a compressor component slidably engaged with an elongate member, the elongate member threadedly engaged with an opening passing through a center of the base component; and a fastening component threadedly engaged with the elongate member such that, when rotational force is applied in a clockwork direction to the fastening component, the compressor component is forced in a downward direction.

2. The device of claim 1 wherein the base component comprises:

a horizontally-oriented member with two vertically-oriented members extending therefrom at opposite ends of the horizontally-oriented member; and two projections horizontally and outwardly extending from each terminating end of the two vertically-oriented members.

3. The device of claim 2 wherein each projection includes an opening passing through a center thereof.

4. The device of claim 3, further comprising, two laterally-positioned elongate members threadedly engaged with the openings passing through the projections.

5. The device of claim 1 wherein the compressor component comprises a U-shaped member having a vertically-oriented support with an opening therethrough.

6. The device of claim 5 wherein a bottom surface of the U-shaped member includes a downwardly-projecting flange about a periphery thereof.

7. The device of claim 5 wherein, when slidably engaged with the elongate member, the U-shaped member of the compressor component projects horizontally and outwardly relative to the base component.

8. The device of claim 7 wherein a diameter of the elongate member is less than a diameter of the opening of the vertically-oriented support of the compressor component.

9. A device for removing a valve spring, comprising:

a base component, the base component comprising a U-shaped member with two outwardly extending projections extending from terminating ends of the U-shaped member;

an elongate member at least partially engaged with an opening passing through a center of the base; and a compressor component, the compressor component comprising a vertically-extending back support having a proximal end and a distal end wherein two outwardly-projecting prongs extend from the distal end of the vertically-extending back support, the compressor component slidably engaged with an elongate member via a bore through the vertically-extending back support.

10. The device of claim 9 wherein each projection further comprises a projection opening passing through a center of each projection.

11. The device of claim 9 wherein each outwardly-projecting prong further comprises a downwardly-projecting flange about a periphery thereof.

12. The device of claim 9 wherein, when slidably engaged with the elongate member, the two outwardly-projecting prongs of the compressor component projects horizontally and outwardly relative to the base component.

13. The device of claim 9 wherein a diameter of the elongate member is less than a diameter of the bore passing through the vertically-oriented back support of the compressor component.

14. The device of claim 9, further comprising, a fastening component threadedly engaged with the elongate member such that, when rotational force is applied in a clockwork direction to the fastening component, the compressor component is forced in a downward direction.

15. The device of claim 9, further comprising, two laterally-positioned elongate members threadedly engaged with the projection openings.

16. A method of removing a valve spring from an engine, comprising:

positioning two horizontally and outwardly-extending arms of valve spring tool on opposing vertically-extending components on a cylinder head;

securing the arms to the opposing vertically-extending components by applying rotational force in a first direction to threaded members passing through openings in the arms and the opposing vertically-extending components;

positioning two prongs of a compressor component on a valve spring head, the compressor component connected to the valve spring tool by slideable engagement with an elongate member, the elongate member threadedly engaged with a base component of the valve spring tool;

applying rotational force in the first direction to the elongate member to compress the valve spring; and applying rotational force in a second direction to the elongate member to remove the valve spring.

17. The method of claim 16 wherein the valve spring tool is positioned on the cylinder head while the cylinder head remains in the vehicle.

* * * * *